No. 753,689. PATENTED MAR. 1, 1904.
J. P. FABER.
SPEED WAGON.
APPLICATION FILED NOV. 25, 1903.
NO MODEL. 2 SHEETS—SHEET 1.
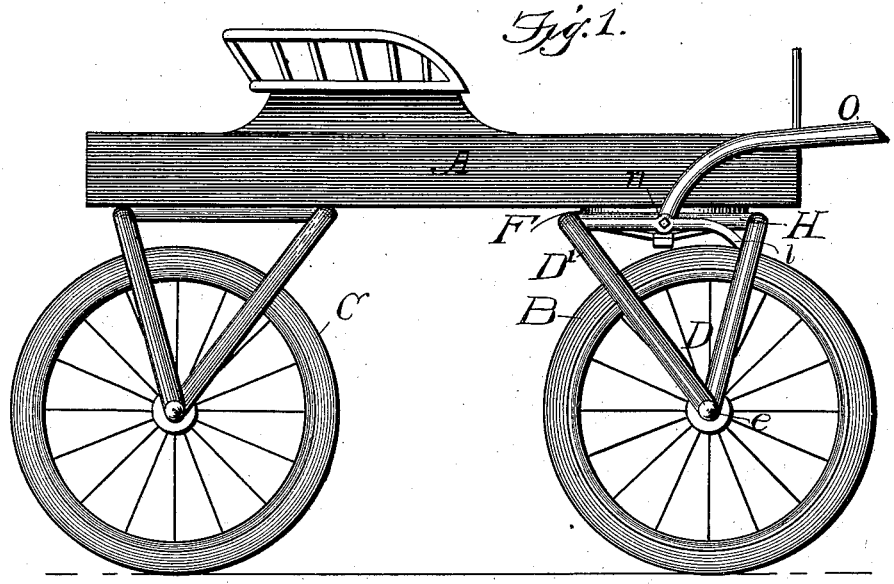
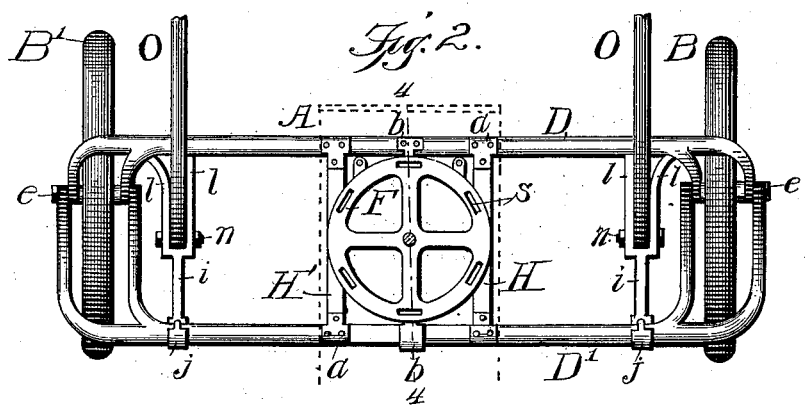
Witnesses
J. F. Pattison
Fred W. Englert
Inventor
John P. Faber
By Wilkinson & Fisher
Attorneys No. 753,689. PATENTED MAR. 1, 1904.
J. P. FABER.
SPEED WAGON.
APPLICATION FILED NOV. 25, 1903.
NO MODEL. 2 SHEETS—SHEET 2.
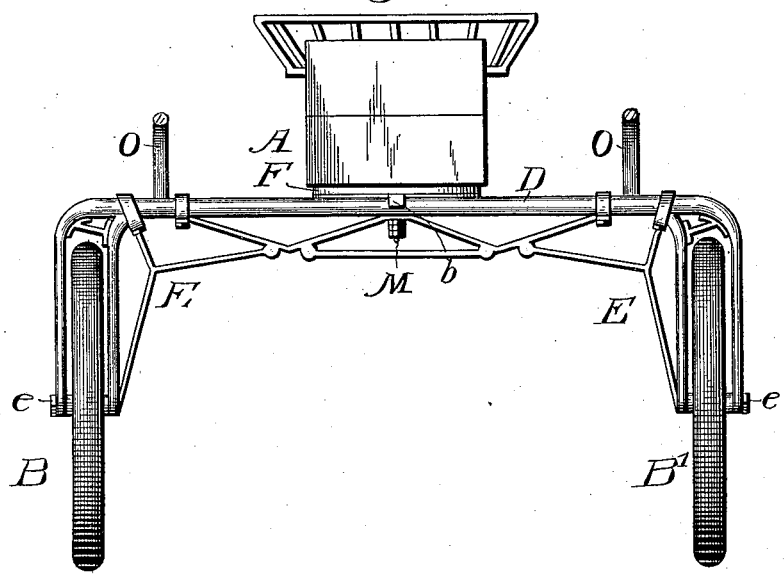
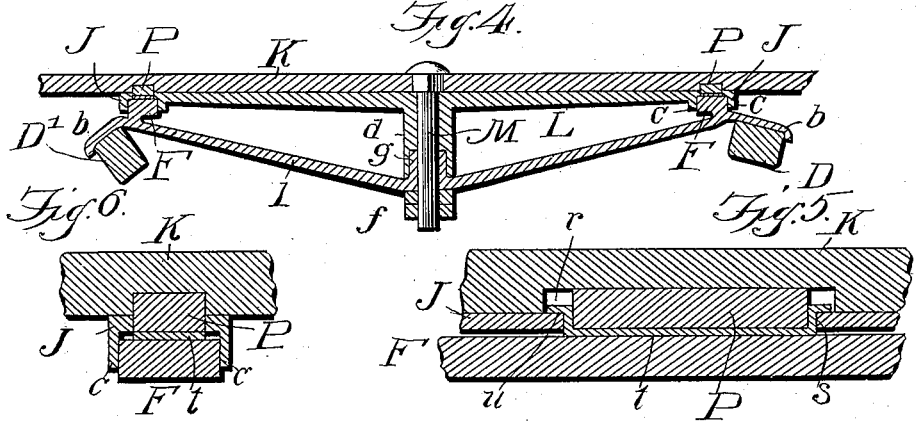
Witnesses
J. F. Pattison
Fred W. Englert
Inventor
John P. Faber
By Wilkinson & Fisher
Attorneys No. 753,689. Patented March 1, 1904.

UNITED STATES PATENT OFFICE.

JOHN P. FABER, OF ROCHESTER, NEW YORK, ASSIGNOR, BY MESNE ASSIGNMENTS, TO THE FABER SULKY CO., OF ROCHESTER, NEW YORK, A CORPORATION OF NEW YORK.

SPEED-WAGON.

SPECIFICATION forming part of Letters Patent No. 753,689, dated March 1, 1904.

Application filed November 25, 1903. Serial No. 182,664. (No model.)

*To all whom it may concern:*

Be it known that I, JOHN P. FABER, a citizen of the United States, residing at Rochester, in the county of Monroe and State of New York, have invented an Improvement in Speed-Wagons, of which the following is a specification, reference being had to the accompanying drawings.

My invention relates to certain improvements in speed-wagons, which improvements are fully described and illustrated in the following specification and the accompanying drawings, the novel features thereof being specified in the claims annexed to the said specification.

In the accompanying drawings, Figure 1 is a side elevation. Fig. 2 is a plan view of the front axle and fifth-wheel. Fig. 3 is a front elevation. Fig. 4 is a central section on the line 4 4, Fig. 2. Fig. 5 is a longitudinal section through one of the antirattlers. Fig. 6 is a transverse section of the same.

A represents the body, B B the front wheels, and C the rear wheels. The front axle consists of the two inclined trusses D D', preferably made of bent wood and stiffened by any suitable metallic bracing E, as indicated in Fig. 3.

F is the lower or movable member of the fifth-wheel, which is attached to the front truss-axle at its sides by the bars H H', preferably of wood, secured to the trusses by clips. Centrally the brace I, Fig. 4, is prolonged into the clips $b$, which are attached to the trusses. The wheels run on pins or axles $e$, supported at both their inner and outer ends by the downwardly-bent arms of the trusses, as shown.

The upper or stationary member J of the fifth-wheel is attached to the bottom K of the body in any suitable manner, being provided with the cross-bar L, Fig. 4, and the circular flanges $c$ $c$, within which the movable member F turns.

M is the king-bolt, which passes through the bottom K and a boss $d$ on the cross-bar L, being secured by the jam-nuts $f$. A circular recess is made in the lower end of the boss $d$, into which fits a circular lug $g$ on the cross-brace I of the movable member F.

On each side of the body the thills O are pivoted to the braces $i$, attached at their ends to the trusses D D'. As shown, these braces consist of a rear portion attached to the rear truss D' by the clip $j$, and the bifurcated front portion $l$, secured by bolts or clips to the front truss D. $n$ denotes pivoted bolts by which the thills are attached to the braces $i$.

To prevent rattling, I form recesses $r$, Fig. 5, in the lower side of the bottom board K and insert in them pieces P, of rubber or other suitable elastic material, which project through perforations $s$, Figs. 2 and 5, in the upper member of the fifth-wheel and bear against the lower member F by the metallic bearing-plates $t$. To keep the plates in place, their ends are bent upward and outward, as indicated at $u$, Fig. 5. By this arrangement all noise or rattling in the connection of the lower portion of the fifth-wheel with the body is effectually prevented.

Having thus described my invention, what I claim as new, and desire to secure by Letters Patent, is—

1. In a speed-wagon, the combination of a recessed body, a support for one end thereof, a fifth-wheel, the stationary member of said fifth-wheel being secured to said body, and the movable member of said fifth-wheel being secured to said support, and antirattling devices located in the recesses of said body between parts of the members of said fifth-wheel, substantially as described.

2. In a speed-wagon, the combination with a recessed body, of a perforated member of the fifth-wheel attached to said body, a movable member of the fifth-wheel, a central pivot, and an antirattling-cushion located in the recess in said body, and having a metallic facing in the perforations in the stationary member of the fifth-wheel, and bearing against the movable member, substantially as described.

3. In a speed-wagon, the combination of a recessed body, a support for one end of said body, a fifth-wheel, the stationary member of said fifth-wheel being secured to said body, and the movable member of said fifth-wheel being secured to said support, said stationary member being also provided with slots and a central downwardly-projecting hollow portion, a king-bolt in said hollow portion and passing through the movable member of the fifth-wheel, and antirattling devices, said antirattling devices consisting of resilient cushions and metallic facings located in the recesses of said body and passing through the slots in said movable member of the fifth-wheel, substantially as described.

In testimony whereof I affix my signature in presence of two witnesses.

JOHN P. FABER.

Witnesses:
    JAS. M. POWELL,
    GEO. B. SELDEN.